July 10, 1923.
A. PARLOW
1,461,197
SIGNAL AND GUIDE LIGHT FOR MOTOR VEHICLES
Filed Sept. 12, 1922
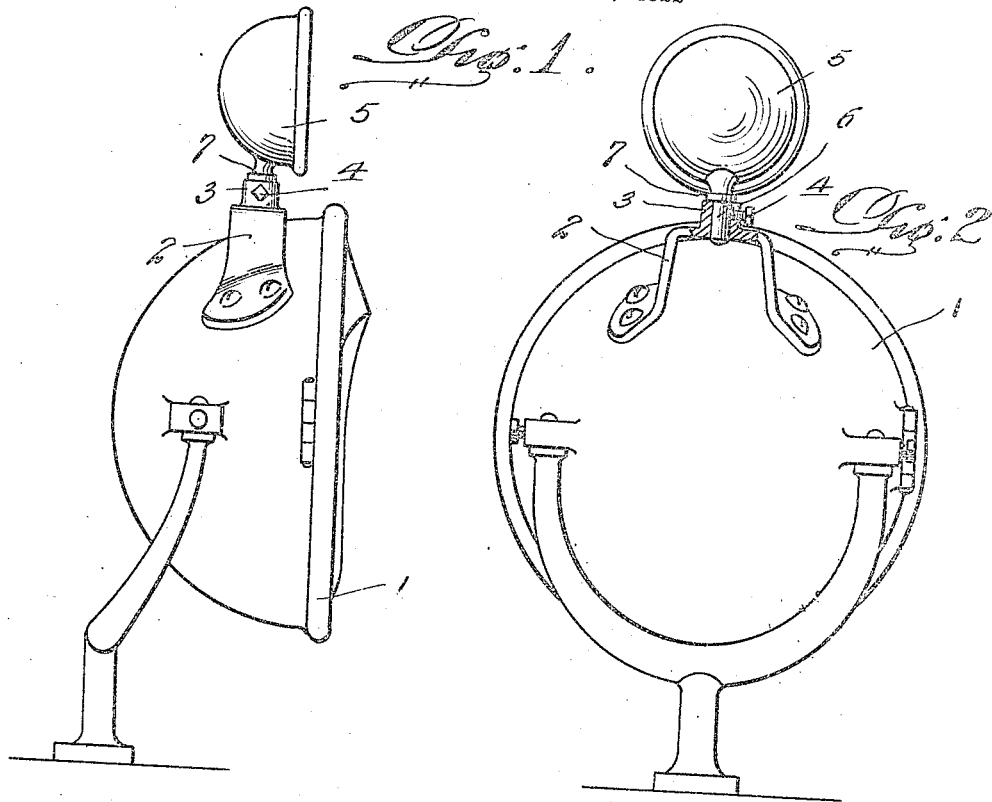
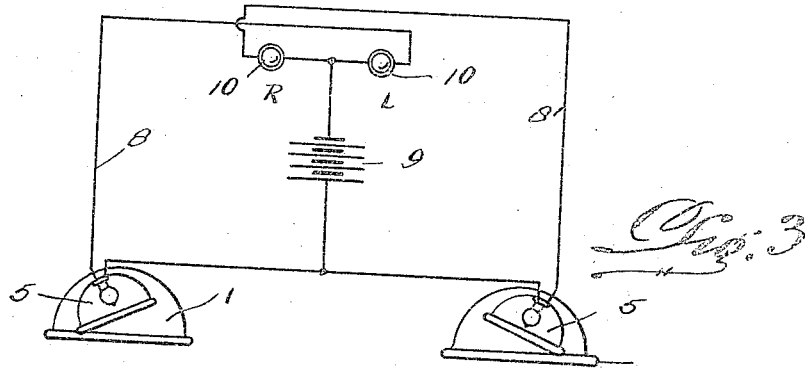
Witnesses:
Inventor
Anna Parlow,
By Clarence A. O'Brien
Attorney Patented July 10, 1923.

1,461,197

UNITED STATES PATENT OFFICE.

ANNA PARLOW, OF COELLO, ILLINOIS.

SIGNAL AND GUIDE LIGHT FOR MOTOR VEHICLES.

Application filed September 12, 1922. Serial No. 587,724.

*To all whom it may concern:*

Be it known that I, ANNA PARLOW, a citizen of the United States, residing at Coello, in the county of Franklin and State of Illinois, have invented new and useful Improvements in Signal and Guide Lights for Motor Vehicles, of which the following is a specification.

In carrying out the present invention it is my purpose to provide a signal and guide light for motor vehicles, whereby the operator of the vehicle may illuminate a turn in the road so as to enable such operator to clearly see the turn in order to negotiate the same safely and whereby the operators of other vehicles or pedestrians in the vicinity of the turn will be apprised of the direction about to be taken by the vehicle equipped with my signal and guide light.

It is also my purpose to provide a signal and guide light for motor vehicles which may be mounted above and secured to the headlights of the vehicle and disposed at such angle that the roadway in advance of the vehicle at either side may be illuminated so that the operator of the vehicle will be enabled to negotiate a turn with ease and facility.

In furtherance I provide signal and guide lights for motor vehicle which will embrace the desired features of simplicity, efficiency and durability, which may be manufactured and marketed at a small cost and which may be quickly and conveniently put into and out of service.

With the above recited objects in view and others of similar nature, the invention resides in the construction, combination and arrangement of parts hereinafter set forth in and falling within the scope of the appended claim.

In the accompanying drawing:—

Figure 1 is a view in side elevation showing one of my guide lights as mounted upon the headlight of the motor vehicle.

Figure 2 is a rear elevation of the same partly in section.

Figure 3 is a diagrammatic view showing the wiring for the signal and guide lights.

Referring now to the drawings in detail, 1, 1 designate the headlights of a motor vehicle. These headlights or lamps may be of any suitable or approved construction and are fastened to the vehicle in a conventional manner.

In accordance with my invention I rivet or otherwise secure to the top of each headlight 1 an inverted U-shaped bracket or yoke 2 and formed integral with the horizontal portion of the yoke and upstanding therefrom is a hollow boss 3 that carries a set screw 4.

5, 5 designate my improved signal and guide lamps or lights. Each lamp 5 is arranged above the corresponding head lamp 1 of the motor vehicle and the casing thereof is provided with a depending shank 6 arranged within the boss 3 and formed with a collar 7 above the boss adapted to engage the upper end thereof so as to limit the downward movement of the shank within the boss.

These signal and guide lamps 5, 5 are arranged to throw the rays of light toward the sides of the road and when the signal and guide lamps have been turned to the desired positions the set screws 4 are tightened so that the lamps will be held in the adjusted position.

In the present form of my invention the right lamp at the right hand side of the vehicle (facing toward the front) throws rays of light to the left side of the road, while the signal and guide lamp of the left side of the vehicle (facing toward the front) directs its rays of light toward the right side of the road.

These signal and guide lamps 5, 5, are connected in electric circuits 8 that include a common source of electric energy such for instance as battery 9, and individual control switches 10, respectively.

In practice when it is desired to energize one of the signal and guide lamps so that the rays of light therefrom will be thrown in the desired direction, the particular switch 10 is operated thereby closing the circuit 8 of the lamp to energize the latter.

It will be seen that when desired the guide lamp is illuminated the roadway will be lighted up so that the operator of the vehicle may negotiate the turn with comparative safety, while the operators of other vehicles and pedestrians in the vicinity of the turn will be apprised of the intention of such driver.

I have entered into a detailed description of the construction and relative arrangement of the parts embraced in the present and preferred embodiment of my invention, in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of the invention as defined in my appended claim.

Having described my invention, what I claim and desire to secure by Letters-Patent, is:—

In combination with the main right and left headlights of a motor vehicle mounted in fixed position at the front of the vehicle to illuminate the road directly ahead of the latter, of an auxiliary curve illuminating lamp mounted on top of the casing of each main headlight, said curve illuminating lamps being arranged in forwardly converging relation whereby the paths of their rays cross each other for utilizing the lamp on the right headlight to illuminate a left-hand curve and the lamp on the left headlight to illuminate a right-hand curve, the mountings of the lamps permitting rotary adjustment of the latter about a vertical axis whereby the desired degree of convergence of said lamps may be had, at will, and means to secure said lamps in adjusted position, each lamp mounting further embodying an inverted U-shaped bracket fixed on the headlight casing and having an integral central hollow boss and a vertical depending stem rigid with the casing of the lamp and rotatably positioned in said boss.

In testimony whereof, I affix my signature.

ANNA PARLOW.